Feb. 15, 1955 G. KAYE ET AL 2,702,310
BATTERY CONSTRUCTION
Filed Sept. 22, 1953 2 Sheets-Sheet 1
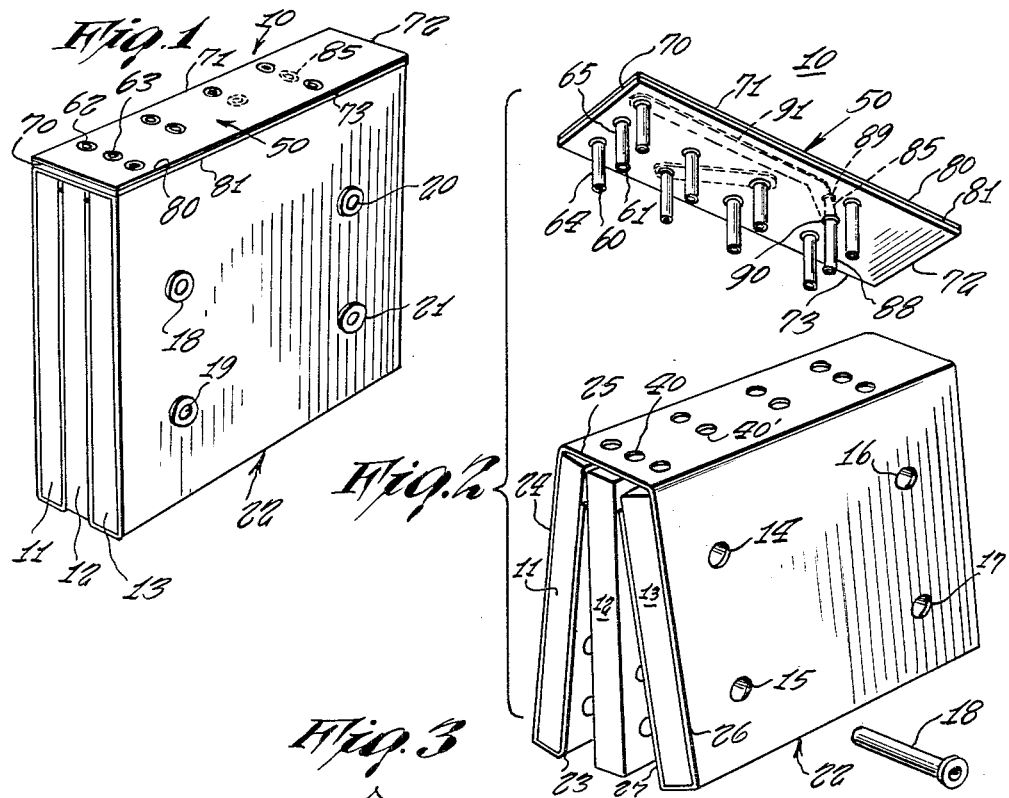
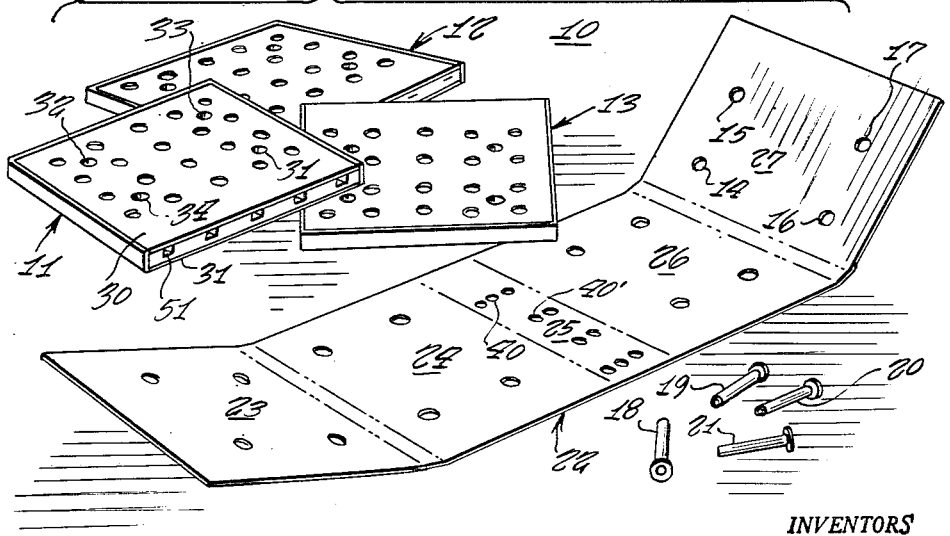
INVENTORS
GORDON KAYE
& HERBERT JACOBEL
BY
Nicholas Lange?
ATTORNEY

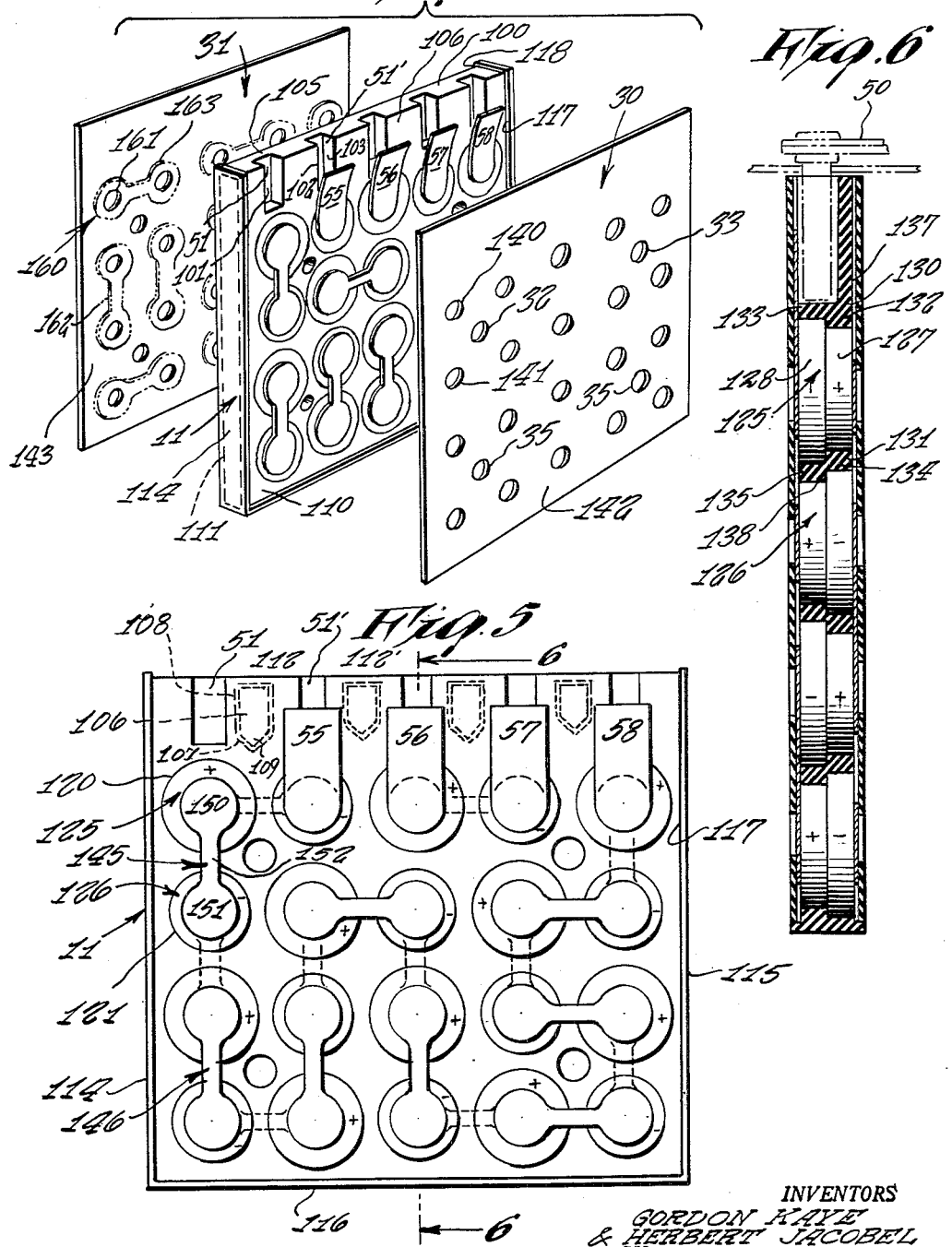

United States Patent Office 2,702,310
Patented Feb. 15, 1955

2,702,310

BATTERY CONSTRUCTION

Gordon Kaye, Mount Kisco, and Herbert Jacobel, Yonkers, N. Y., assignors to P. R. Mallory & Co., Inc., Indianapolis, Ind., a corporation of Delaware Application September 22, 1953, Serial No. 381,622

14 Claims. (Cl. 136—111)

The present invention relates to the construction of electric batteries formed of a multiplicity of primary cells and is particularly directed to such devices including means and methods for constructing and assembling high voltage batteries from a composite of several individual low voltage units.

It is an object of the present invention to provide a novel and improved type battery construction utilizing a multiplicity of individual primary cells.

It is another object of the present invention to provide a novel battery comprising a plurality of tiered, welded tray primary cell units interconnected by means of stamped, printed or fabricated circuits.

Still another object of the present invention is to construct an electric battery comprising a plurality of low voltage cells in a manner such that any desired high voltage may be obtained by interconnecting unitary molded trays including a desired number of such primary cells; the connection between the individual trays and the cells included thereby being made by means of stamped, printed or fabricated circuits adapted to serve as cell or terminal connections.

Yet another object of the present invention is to fabricate an improved battery comprising a plurality of separate, molded tray sections of a predetermined configuration, each tray adapted to be interconnected and containing a multiplicity of individual primary cells within the thickness thereof with each of said individual cells adapted to be connected to an adjacent cell.

Still another object of the present invention is to fabricate a high voltage battery comprising a plurality of trays containing individual cells, each of said trays having a desired voltage but which may in conjunction with other trays provide a greater voltage.

Other advantages become apparent in the present invention in which the construction makes possible the elimination of excessive handling of cell and battery components during manufacturing and facilitates applications for automatic methods in wiring and assembling the components thereof.

The invention, in another of its aspects, relates to novel features of the instrumentalities described herein for the principles of the present invention and to the novel principles employed in the instrumentalities whether or not these features and principles may be used in the said object and/or in the said field.

Other objects of the invention and the nature thereof will become apparent from the following description considered in connection with the accompanying figures of the drawing and wherein the scope of the invention is determined rather from the dependent claims.

The present invention makes possible the construction of a high voltage battery wherein stamped, printed or prefabricated circuits may be used to eliminate wiring connections between individual components thereof and wherein automatic welding construction techniques eliminate former cumbersome procedures of soldering.

In the battery of the present invention, a separate receptacle plate for a socket is eliminated inasmuch as the battery socket is automatically fabricated when the battery is assembled. The plug of the present battery invention incorporates inter-section connectors which complete battery circuits upon the insertion of a plug and at the same time permits the connection of the battery to the electrical device drawing power from it. The present invention, because of the construction stated above, permits a high voltage battery to remain on storage with its low voltage units being disconnected, thus, to substantially reduce the danger of electrical breakdown of the entire battery during storage.

Another improvement made by the present invention is in the constructional use of a plastic mounting holder for a multiplicity of the individual battery cells. This novel construction eliminates the usual stresses from the inter-cell connectors during periods of shock and vibration.

Moreover, each of these plastic trays comprises a multiplicity of cells and may serve as a battery, per se, and since unit trays may be built for any desired voltage and for multiples of a tray unit, such a battery may be constructed inexpensively and without great cost for parts.

In the battery thus novelly constructed, the tray units are adapted to be separated from one another by means of an insulative wrapper which is adapted to provide an exterior covering for the entire battry wall, while at the same time the wrapper is also adapted to be given desired definitive and/or directive coloring and upon which there may be placed labelling and technical information.

There is thus provided by the present invention a tiered, welded tray battery construction wherein the connections and terminals are interlockable in nature. This makes for economy, rapid assembly of batteries of any high desired voltage and obviates the necessity for cumbersome assembly techniques and large inventories of batteries having different voltage outputs.

In the drawings:

Figure 1 is a pictorial, profile illustration of an embodiment of the invention as adapted to illustrate the constructional assembly of the novel welded tray battery comprising interlocked individual trays of multiple battery cells;

Figure 2 is a perspective view of the embodiment of the invention shown in Fig. 1, but wherein the assembled cooperative relationship of the individual trays carrying the multiple cell units thereof is more advantageously shown and wherein the efficient connection and terminal locking between tray units is observed;

Figure 3 is an exploded, assembly view of the welded tray battery invention herein, adapted to illustrate the unitary relationship between the individual tray units and wherein the shielding wrapper encompassing said trays internally and externally is seen to be of one piece and as having a multiplicity of pierced or apertured frames through which may be passed the locking studs, rivets and plug in a novel, simple and efficient manner;

Figure 4 is an expanded, perspective and illustrative view of one of the figures of said battery as adapted to illustrate the novel constructional features thereof;

Figure 5 is a plan, construction view of a tray unit of the novel battery herein adapted to show the unique configuration as adapted to include the multiple cell units in the pre-forms thereof and as adapted to illustrate the inter-connections made between the individual cells thereof; and Figure 6 is a vertical cross-sectional view of the tray unit shown in Figure 5 as taken along line 6—6 thereof and as adapted to show the constructional mounting and inclusion of the cells within the unitary molded pre-forms made therein.

Generally speaking, the present invention of a multi-tiered welded tray battery comprises a plurality of individual plastic trays which are unitarily molded to include a severality of pre-forms or containing apertures therein in a manner such that individual battery cells may be tightly fitted and confined therein. The individual cell units of opposite polarity are adapted to be placed adjacent each other and expediently inter-connected. By the nature of the molded configuration and construction of the pre-forms, the cells as assembled will be retained in position at all times and may be handled as a unit prior to wiring.

In Figures 1-3 there is disclosed the multi-tiered welded tray battery of the present invention. The assembled battery 10 comprises a plurality of plastic molded trays 11, 12 and 13 having pre-forms or apertures in which the individual primary cell units are adapted to be snugly fitted (Figs. 4–6). The plastic trays 11, 12 and 13 may be placed one against the other in tiers or layers and because of guide holes such as 14–17 placed therethrough, as hereinafter described, may be readily locked together and tightly assembled by means of elongated hollow rivets or pins 18, 19, 20, 21 passing through the guide holes as stated. A fabricated or plastic wrapper 22 having several panels 23, 24, 25, 26 and 27 envelops trays 11, 12, 13, with trays 11 and 13 being insulated from tray 12 by means of panels 23 and 27, for example, of wrapper 22. It is to be observed that in addition each tray has a pair of thin plastic shields 30, 31 which are apertured and fittable on both sides of the tray within the walls thereof. Four of the apertures of the thin plastic shields 32, 33, 34 and 35 cooperate with guide apertures 14–17 to allow the locking rivets to pass through each of the trays and to thus lock and support the individual tray units together to form a unitary battery assembly. The remaining apertures in the plastic shields are adapted to allow for automatic welding of the interconnectors of the individual primary cells, as will be more fully described hereinafter.

Panel 25 of the wrapper 27 is adapted to act as the side panel and covers the tip or side end of the assembled battery. It also is apertured having a plurality of apertures such as 40, 40', etc. defining a specific configuration. This apertured configuration depends on the manner and number of individual tray cell bearing units desired to be interconnected to fulfill a desired high voltage characteristic. The interconnections between the tray units are made at one end of the trays wherein plug 50 is adapted to mate with the female socket formed by unitarily formed cut-outs such as 51, 51' made in an end of each tray. As desired, metal spring conductor terminals 55, 56, 57, 58 are connected to a cell of any inter-related connection group of primary cells contained within the individual tray. These flat spring conductor terminals 55–58 overlie cut-out portions 51, 51' of the female portion of the socket integrally molded at the end of each tray, such as 11. Male plug 50 is insertable in the socket formed of the cut-out at the end of the trays. Plug 50 comprises a plurality of prongs or spherical conductor rivets such as 60 and 61 having head portions 62, 63 and shank portions 64, 65. The plug is made rectangular in shape having side and end walls 70, 71, 72 and 73 and is comprised of two thin rectangular sheets 80 and 81 of plastic material, one of which may be thicker than the other. Each head portion, such as 85 of plug prong 88 has two rims 89, 90 separated by a body portion which allows a connecting strip 91 to lie between the two sheets and there to tightly connect the individual prongs as desired by being inserted between the two rims of the plug prong. The connections between the prongs of the plug may be made as desired in order to effectuate a desired voltage arrangement between the trays and associated equipment.

In Figures 4–6 the construction of an individual tray such as 11, having two flat rectangular surfaces 110 and 110' and containing means for containing a plurality of primary cells is shown. Tray 11 is fabricated of plastic and is unitarily molded so as to contain a plurality of cut-out pre-forms 51, 51' in end wall 100 therein. Cut-outs 51, 51' are molded at discrete intervals in end wall 100, for a substantial part of the thickness thereof. Thus each cut-out is rectangular and box-like in shape having a bottom wall 101, a closed end wall and two lateral walls 102 and 103 extending therefrom, and leaving a remaining thickness 105 in the end wall. Between each of the cut-outs 51 and 51' there are intervening flat surfaces such as 106. However, from Fig. 5, it is observed that these flat surface intervals provide the under surface for other cut-outs 112, 112' which have a substantial thickness and are of arrow shaped configuration comprising bottom wall 106, side walls 107 and 108 and arrow end wall 109. Tray 11 has three side walls 114, 115 and 116 so molded that two lips 117 and 118 are provided for receiving insulating and connector supporting partitions or shields such as 30 and 31.

The tray 11 has annular apertures such as 120 and 121 cut out at predetermined intervals therealong and entirely through the thickness thereof. It is seen that the diameter or circumference of adjacent cut-outs is different in size. For example, cut-out 120 is larger than cut-out 121. By reference to Fig. 6, it is seen that each cell such as 125 and 126 has a positive end 127 and a negative end 128, the negative end 128 being of greater diameter than the positive end 127. It is also seen that the walls 130 and 131 are formed in a stepped fashion and comprise steps 132, 133 for wall 130 and steps 134 and 135 for wall 131, each including a shoulder 137 and 138 formed thereby and against which the inserted cells are adapted to be placed so as to be confined thereagainst in an essentially tight and stepped manner, yet withal in a substantially resilient fashion. By the nature of the cut-out construction in the tray providing for strong retaining walls for each of the primary cells and wherein each of the cells may be introduced therein in a manner such that opposite polarities of each cell are placed next or adjacent each other (since the cut-outs are made of different adjacent diameters) series connections can be made between each pair of cells with fool-proof rapid and novel automatic welding techniques used in conjunction with the shields 30 as will now be discussed.

Shields 30 are made of plastic and as discussed above are adapted to fit on both sides of tray 11 within the confines of the lips 117, 118 of each of the side walls 114, 115 and 116. Each shield has a multiplicity of apertures 140, 141 passing entirely through top and under surfaces 142 and 143 thereof. These apertures are adapted to directly over-lie each of the primary cell ends. Connections between adjacent cells are made by dumb-bell shaped connectors of thin, metal strips such as 145 and 146 having annular head portions 150 and 151 interconnecting opposite polarity ends of two adjacent primary cells by means of connecting strip 152 integrally joined to each head portion.

Previous to being staked to the primary cells the individual connectors 145 and 146 are adapted to temporarily be retained within slight conforming impressions 160 made in the underside, for example 143 of shield 31. These temporary holding impressions have head portions 161 and 163 interconnected by link 162. Each connector such as 145 is held above the adjacent ends of the primary cells within the impression made in the underside of the shield for the tray.

As stated, perforations are made in the shields of the trays and these perforations are such that welding electrodes bear against the heads of the connectors to bring two adjacent batteries together. Thus, when the plastic shield or plate 30 or 31 with its connectors is placed connector side down on the top of the cells, it is possible to weld these connectors directly to the steel cell tops by means of a top welding process, i. e. two electrodes carrying ± polarities of a welding machine contact one surface only such that the current will go down through the connector into the cell top, back through the connector and up into the other electrode. The process may be then repeated, in a similar fashion, on the other side of the tray with the opposite shield being adapted to be placed above the opposite end of the primary cells, making connections therebetween by the stamped connectors held within the impressions of its shield. The spring terminals such as 55, 56, 57 and 58 for each battery side are also staked and automatically welded so as to form the terminals of the individual tray units. Plug 50 with prongs such as 60, 61 may then be inserted so as to simultaneously connect the tray units to provide a high voltage battery having as many single units as desired. Each of the tray units may be thus adapted to form a complete battery handled by itself or may become a single unit for a composite plural unit of a determined high voltage assembly.

By the present invention, therefore, it is possible to construct the tray units as desired to build up any battery unit of single and multiple voltages and of varying geometry. When the battery is ready to be assembled, rivets 18 and 20 are passed through the apertures in the units needed and eyeletted to form the final assembly. This eyeletting, of course, will also fasten the panels of the wrapper to the units providing the necessary outer wrapping and all inter-unit insulation.

While the present invention describes a novel multi-unit welded tray battery assembly, it is not intended that the invention be limited to the embodiments thereof but rather to be given its proper scope and intent as shown by the following claims.

What is claimed is:

1. An electric battery comprising a plurality of flat trays, said trays having apertures cut therethrough, a plurality of primary cells adapted to be fitted within said apertures, means interconnecting said primary cells in each tray, insulative means placed on each side of said individual trays, a wrapper for said battery, clamping means for holding said trays and said wrapper together, and a plug for electrically interconnecting the individual trays of said battery to provide a desired output voltage.

2. An electric battery comprising a plurality of flat trays having lower and upper surfaces, said trays having apertures of different sizes cut therethrough, a plurality of primary cells adapted to be fitted within said apertures in an alternate staggered manner according to the size of the aperture in each surface, means interconnecting said primary cells in each tray, thin insulative means placed on each side of said individual trays, a wrapper for said battery, clamping means for holding said trays and said wrapper together, and a plug for electrically interconnecting the individual trays of said battery to provide a desired output voltage.

3. An electric battery comprising a plurality of flat trays having upper and lower surfaces, said trays having apertures of varying diameters cut in staggered relationship on each surface, a plurality of primary cells adapted to be fitted within said apertures in alternate staggered manner in accordance with diameters of said apertures, conductor means interconnecting said primary cells in each tray, flat, plastic insulative means placed on each side of said individual trays covering each surface thereof, a wrapper for said battery, clamping means for holding said trays and said wrapper together, and a plug for electrically interconnecting the individual trays of said battery to provide a desired output voltage.

4. An electric battery comprising a plurality of integrally moulded flat trays having upper and lower surfaces, said trays having staggered apertures of varying diameters cut in each of said surfaces, a plurality of primary cells adapted to be fitted within said apertures in staggered relationship conforming to the size of said apertures, electrical means interconnecting said primary cells placed adjacent each other in each tray, plastic insulative means placed on each side of said individual trays, said plastic means having small apertures cut therein, a wrapper for said battery, clamping means for holding said trays and said wrapper together, and a plug for electrically interconnecting the individual trays of said battery to provide a desired output voltage.

5. An electric battery comprising a plurality of integrally moulded flat trays each having an upper and lower surface, each of said trays having adjacent apertures of varying dimension cut therethrough, the apertures in directly opposite surfaces also being of different diameters, shoulders formed midway on the thickness of said tray thereby, a plurality of primary cells adapted to be fitted within said apertures, means interconnecting said primary cells in each tray, insulative means placed on each side of said individual trays, a wrapper having a plurality of panels for said battery, clamping means for holding said trays and said panels of said wrapper together, and a plug for electrically interconnecting the individual trays of said battery to provide a desired output voltage.

6. An electric battery comprising a plurality of integrally moulded flat trays each having an upper and lower surface, said trays having apertures of different diameters on opposite surfaces cut midway therethrough, shoulders formed thereby on said trays, a plurality of primary cells adapted to be fitted within said apertures, strip metal means interconnecting adjacent primary cells in each tray, plastic cover means placed on each side of said individual trays, a wrapper for said battery having several panels formed by folds therein, clamping means for holding said trays and said wrapper panels together, one of said panels having a series of several apertures placed in a predetermined fashion thereon, and a plug for electrically interconnecting the individual trays of said battery through said apertures on said latter panel to provide a desired output voltage.

7. An electric battery comprising a plurality of integrally moulded individual flat trays each having an upper and lower flat surface, said trays having apertures on opposing surfaces of different diameters cut therethrough to the mid thickness thereof, a shoulder for each cell formed thereby, a plurality of primary cells adapted to be fitted within said apertures, strip conductors interconnecting said primary cells in each tray, insulative plastic sheets placed on each side of said individual trays, an insulative wrapper for said battery, clamping means for holding said trays and said wrapper together, and a plug for electrically interconnecting the individual trays of said battery to provide a desired output voltage.

8. An electric battery comprising integral moulded tray means, said tray having two flat spaced surfaces with apertures cut therethrough, opposing apertures being of different diameters, a plurality of primary cells adapted to be fitted within said apertures, means interconnecting adjacent ones of said primary cells, plastic sheets placed on each side of said tray, a wrapper for said tray, clamping means for holding said tray and said wrapper together, and a plug for said battery to provide a desired output terminal for said battery.

9. Primary cell containing means comprising a flat plastic tray, said tray having a determined thickness, two flat rectangular surfaces, side and end walls, a plurality of apertures cut entirely through said thickness and said flat surfaces for receiving a number of individual primary cell units, all but one of said side and end walls having lip extensions, insulation means adapted to fit within the confines of said extensions on said flat surfaces, and socket means moulded in the end wall of said tray free of said lip extensions.

10. Primary cell means comprising a flat moulded tray, said tray having a determined thickness, two flat rectangular surfaces having said thickness therebetween, side and end walls, a plurality of apertures cut entirely through said thickness and said flat surfaces for receiving a number of individual primary cell units, all but one of said side and end walls having lip extensions, insulation means adapted to fit within the confines of said extensions on said flat surfaces, and socket means moulded in the end wall of said tray free of said lip extensions.

11. Primary cell containing means comprising a one piece moulded tray, said tray having a determined thickness, flat upper and lower rectangular surfaces having said thickness therebetween, side and end walls, a plurality of apertures cut entirely through said thickness and said flat surfaces for receiving a number of individual flat primary cell units the top and bottom of which have different polarities, apertures on the surfaces directly opposing each other having different diameters as cut halfway through the thickness thereof, a shoulder formed thereby, said diameters preventing the placement of the wrong end of the cell within said apertures and allowing the shoulder to support said cell, all but one of said side and end walls having lip extensions, insulation means adapted to fit within the confines of said extensions on said flat surfaces, and socket means moulded in the end wall of said tray free of said lip extensions.

12. Primary cell containing means comprising an integrally moulded flat plastic tray, said tray having a determined thickness, flat upper and lower rectangular surfaces having said thickness therebetween, side and end walls, a plurality of apertures cut entirely through said thickness and said flat surfaces for receiving a number of individual primary cell units, rivet apertures penetrating said units, all but one of said side and end walls having lip extensions, insulation means having welding electrode holes cut therethrough adapted to fit within the confines of said extensions on said flat surfaces, connector means interconnecting said adjacent cells of the requisite polarity, moulded, rectangular socket means in the end wall of said tray free of said lip extensions, flat terminal springs adapted to be placed thereover and connected to said cell units, and a plug adapted to be inserted within said socket means.

13. Primary cell containing means comprising an integrally moulded flat plastic tray, said tray having a determined thickness, flat upper and lower rectangular surfaces having said thickness therebetween, side and end walls, a plurality of different diameter apertures cut entirely through said thickness and said flat surfaces in discrete intervals for receiving a number of individual primary cell units, the underside of said intervals having arrow-shaped cutouts formed therein, all but one of said side and end walls having lip extensions, insulation means having welding electrode holes adapted to fit within the confines of said extensions on said flat surfaces, connectors joining the opposite polarities of adjacent cells, and socket means moulded in the end wall of said tray free of said lip extensions.

14. An electric battery comprising a flat tray having a plurality of apertures therethrough, a self-contained individually sealed primary cell in each of said apertures having exposed top and bottom faces constituting its respective terminals, conductor means electrically associated with said cell terminals for interconnecting said cells into a battery, at least one layer of insulation on each side of said tray overlying said cell terminals and said conductor means, means for holding said layer of insulation in assembled relation with said tray, and terminal means for said battery incorporated in said tray and engageable by an electrical connector for connecting the battery to an external circuit.

References Cited in the file of this patent

UNITED STATES PATENTS 2,547,262     Greenstein _____ Apr. 3, 1951